(12) United States Patent
Inderrieden

(10) Patent No.: US 7,416,119 B1
(45) Date of Patent: Aug. 26, 2008

(54) METHODS AND APPARATUS FOR AUTOMATICALLY DETERMINING AND DEDUCTING WEIGHT OF CONTAINERS FOR PRODUCTS

(75) Inventor: Michael T. Inderrieden, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 441 days.

(21) Appl. No.: 11/314,582

(22) Filed: Dec. 21, 2005

(51) Int. Cl.
*G06K 15/00* (2006.01)

(52) U.S. Cl. ...................................... 235/383; 235/378

(58) Field of Classification Search ................. 235/383, 235/385, 378; 705/64, 414
See application file for complete search history.

(56) References Cited

U.S. PATENT DOCUMENTS

| | | | | |
|---|---|---|---|---|
| 4,563,739 A | * | 1/1986 | Gerpheide et al. ............ | 705/28 |
| 5,125,465 A | * | 6/1992 | Schneider .................... | 177/50 |
| 7,085,777 B2 | * | 8/2006 | Beck et al. ................ | 707/104.1 |
| 7,311,250 B1 | * | 12/2007 | Herwig ........................ | 235/383 |
| 2002/0079367 A1 | * | 6/2002 | Montani ...................... | 235/383 |
| 2003/0015585 A1 | * | 1/2003 | Wike et al. ................... | 235/383 |
| 2004/0020723 A1 | * | 2/2004 | Schuman et al. ............. | 186/52 |

* cited by examiner

*Primary Examiner*—Ahshik Kim
(74) *Attorney, Agent, or Firm*—Priest & Goldstein PLLC; Paul W. Martin

(57) ABSTRACT

Systems and techniques for recognizing and distinguishing between different containers in which products to be sold by weight may be placed before purchase. A point of sale terminal includes devices for capturing and evaluating information relating to the presence, absence and identity of container type indicia whose presence characterizes a container as belonging to a particular type having a particular weight. Containers in which products may be placed are given appropriate indicia. When an item is to be sold by weight, the item is weighed and a weight reading is received. Information relating to the presence, absence and identity of indicia characterizing a container type is captured and evaluated, and if a container bearing such indicia is identified, the container weight is subtracted from a weight reading to obtain a net weight for the products.

15 Claims, 5 Drawing Sheets

METHODS AND APPARATUS FOR AUTOMATICALLY DETERMINING AND DEDUCTING WEIGHT OF CONTAINERS FOR PRODUCTS

FIELD OF THE INVENTION

The present invention relates generally to improvements to retail point of sale systems. More particularly, the invention relates to improved systems and techniques for automatically determining weights of containers in which products may be placed before sale and deducting these container weights from weight measurements for products sold by weight.

BACKGROUND OF THE INVENTION

Retail sales, especially supermarket sales, include many sales of products by weight. Many items are placed in containers after selection by customers but before checkout. The weight of such a container when unloaded is known as the tare weight. Placing a loaded container on a scale to produce a weight reading generates a gross weight reading. The gross weight is the tare weight, that is, the weight of the empty container, plus the weight of the product or products. The tare weight must be subtracted from the gross weight to yield the net weight of the product or products being sold.

Containers may include plastic bags, paper bags, for example, for ground coffee or bulk candy, plastic trays, for example, for salads, and the like. For example, a supermarket may provide plastic bags in which customers may place produce, plastic containers in which customers may place salad bar or deli purchases, and the like. In order to comply with legal weight and measure requirements, retailers must deduct the tare weight of a container in which products sold by weight are placed from the gross weight on which the total price of the products is based. However, numerous different types of containers may be used, having different weights, and customers may place the same kinds of products in different kinds of containers having different weights. In addition, some customers may place a particular type of item, such as bananas or bell peppers in a container for purchase, while other customers may purchase such items without placing them into containers.

Many retailers simply deduct a container weight from all purchases of products sold by weight. However, if a customer does not place the products in a container, the retailer's practice of automatically deducting tare weight reduces the retailer's revenue because the retailer is deducting a container weight when no container is actually present. If the checkout transaction is performed by a retailer employee, it is possible to manually deduct the weights of the various containers, but this process adds time and complexity to the transaction. For low priced products in particular, the labor expense incurred in identifying a container and deducting its weight may be greater than the savings achieved. Consequently, in such cases, an automatic deduction in every case may be appropriate. In the case of a customer operated transaction, such as self checkout, the customer may be significantly inconvenienced if required to respond to questions about whether or not a container is being used and to determine and provide identification of the type of container being used.

SUMMARY OF THE INVENTION

The present invention addresses such difficulties by providing an automatic mechanism for recognizing and distinguishing between different containers in which products may be placed before purchase. A point of sale terminal according to one aspect of the present invention includes an image evaluation device. Containers in which products may be placed are given indicia or combinations of indicia that can be associated with a container type having a known weight. Alternative indicia include features giving the container a distinctive appearance, reflected in characteristics such as a distinctive color or a pattern suitably covering the entire container. A database accessible to the point of sale terminal stores records identifying each available set of container characteristics and associates each set of characteristics with a container weight for containers exhibiting that set of characteristics.

For example, when a transaction requires entry of an item sold by weight, products in a container are placed on a scale to generate a weight reading. An image of the weighing volume is captured. The image evaluation device evaluates the image to detect and identify a defined of set characteristics associated with the container. If such a defined set of characteristics is identified, the image evaluation device locates the set of characteristics in the database, determines the weight of the container and deducts the weight of the container from the weight reading to obtain a net weight for the product. Alternatively or in addition, a container in which products are to be placed may include, for example, by imprinting on the container, a large number of identical bar codes so that at least one of the bar codes will be read when the container is placed on a scanner. Each type of container includes its own bar code identifying the container type. Upon detection of a bar code identifying a container type, the weight of the container may be retrieved and deducted from the weight reading produced by the scale, in order to obtain a net weight of the product being sold.

A more complete understanding of the present invention, as well as further features and advantages of the invention, will be apparent from the following Detailed Description and the accompanying drawings.

DETAILED DESCRIPTION

Figure 1:
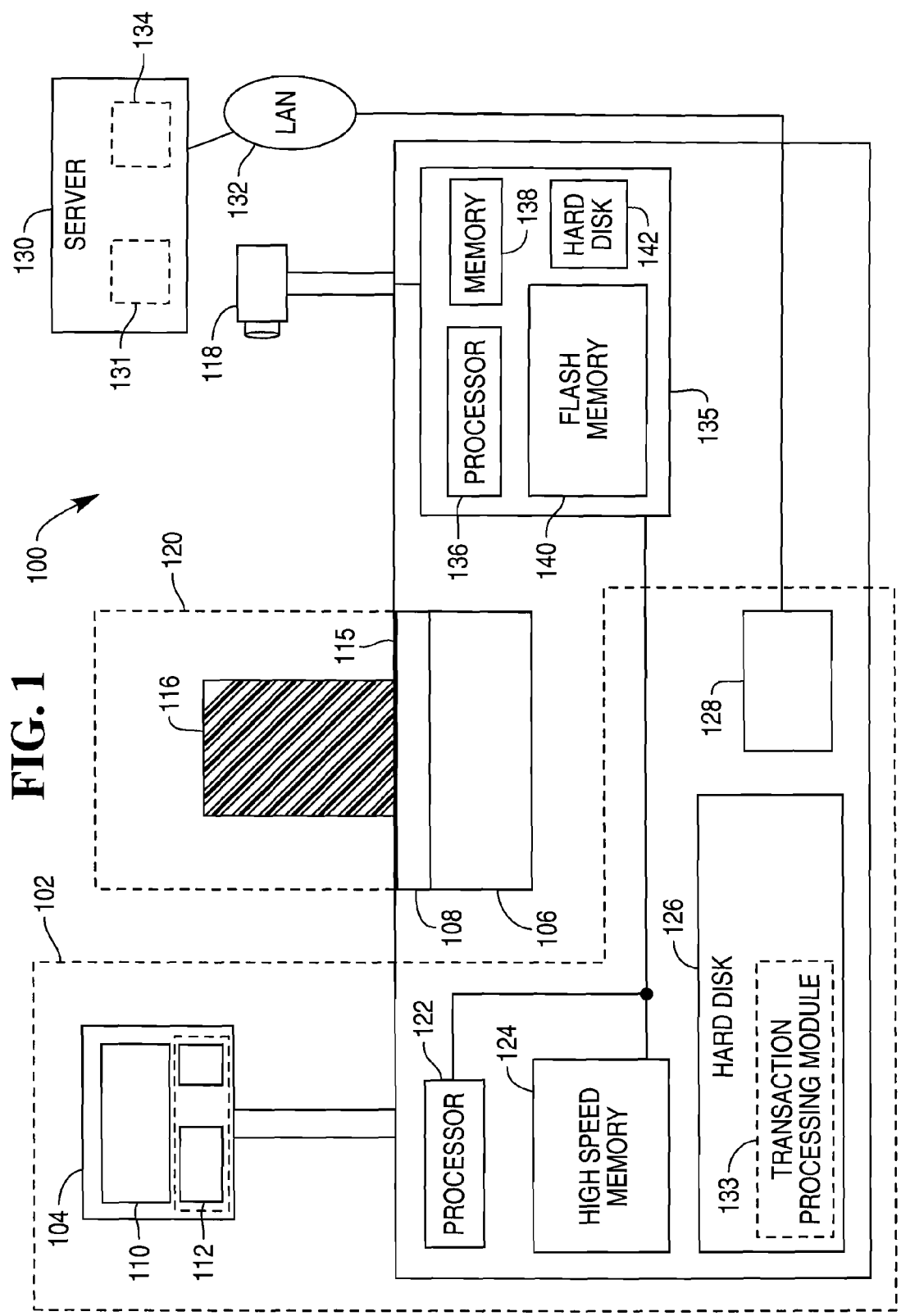
FIG. 1 illustrates a point of sale system employing automatic identification of container types and weights according to an aspect of the present invention.

FIG. 1 illustrates a point of sale terminal 100 according to an aspect of the present invention. The terminal 100 includes a transaction processing device 102 for receiving user inputs and product data and processing transaction entries and payment. The transaction processing device communicates with a user through an external user interface 104, and also communicates with a scanner 106. The scanner 106 includes a scale 108. The user interface 104 includes a display screen 110 and a keypad 112.

As products bearing bar codes are to be processed, they are scanned across a top plate 115 of the scanner 106. The scanner 106 decodes the bar code and transfers the bar code information to the transaction processing device 102 for entry into a transaction. Many items, however, do not carry bar codes and are sold by weight, rather than per item. If the terminal 100 is used at a supermarket, for example, a significant proportion of the products sold using the console 102 are sold by weight. When an item or group of identical items is to be sold by weight, such as an apple or apples, or a customer selected salad from a salad bar, for example, appropriate selections may be made using the user interface 104. For example, a user may indicate that the next item in the transaction is to be sold by weight. In addition, the product to be weighed may be identified. Next, the item or items are placed on the top plate 115 of the scanner 106 and weighed. The transaction processing device 102 is put in a weighing mode, which causes it to look for a weight reading from the scanner 106 and also affects its interpretation of bar code information received from the scanner 106.

Figure 4:
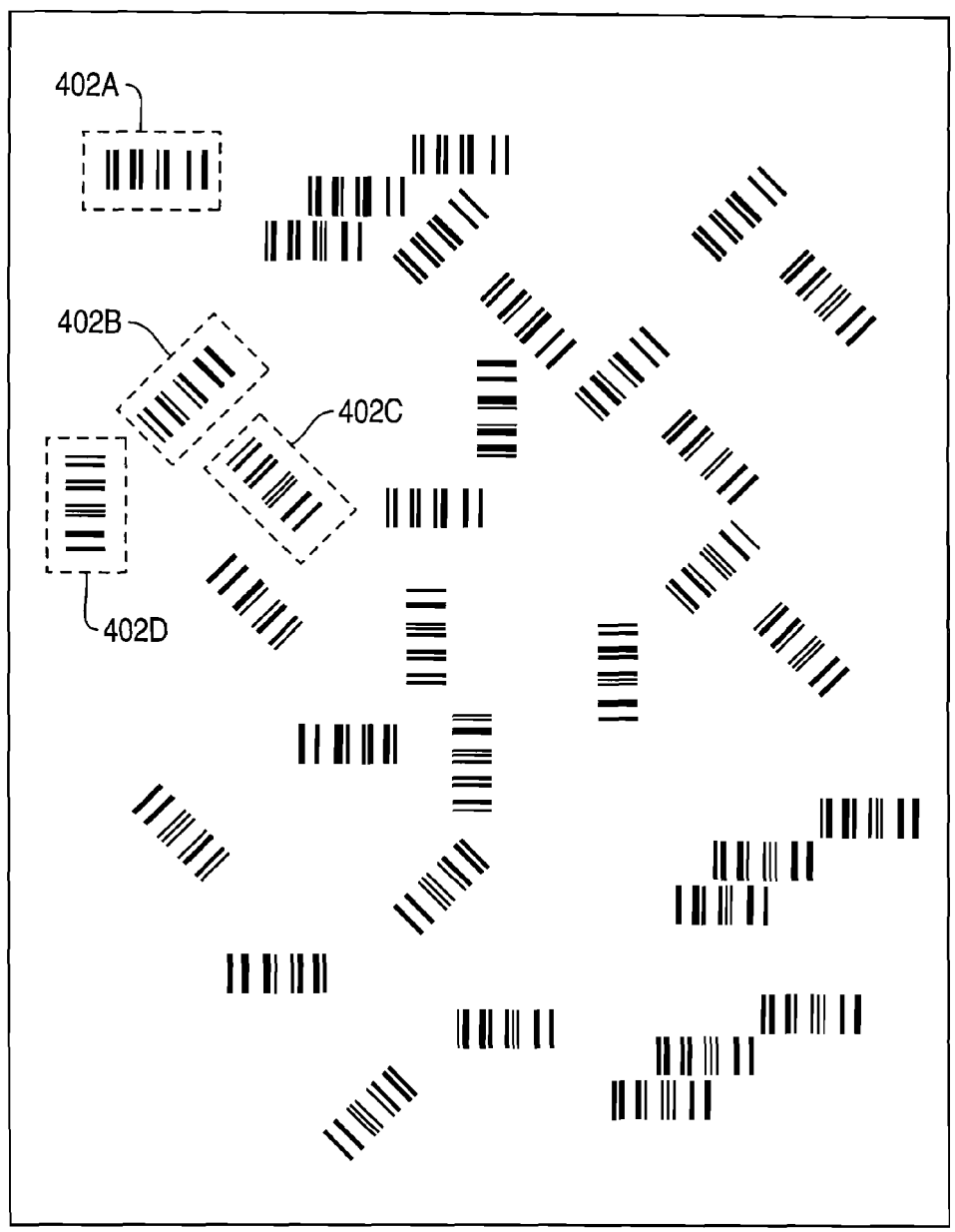
FIG. 4 illustrates a container imprinted with bar codes identifying a container type according to an aspect of the present invention.

In the present exemplary case, a bag 116 of items to be weighed is present on the top plate 115 of the scanner 106. The bag 116 has a distinctive set of visually identifiable characteristics. Examples of such characteristics may include a color, a combination of colors, a pattern or patterns, or a combination of colors and patterns. Another example of visually identifiable characteristics may include distinctive symbols appearing on the bag. For example, the bag may bear images of stars, triangles, or other distinctive shapes. Any number of other characteristics may be used. In addition or as an alternative, a container such as the bag 116 may be imprinted with a large number of identical bar code labels, so that at least one of the labels is highly likely to be scanned when the bag is placed on the scanner 116. An example of such a container is illustrated in FIG. 4.

The set of characteristics is used to identify the container as being a specific type of container whose empty weight is known. The weight of each type of container is stored by the terminal 100 or by a remote storage device accessible to the terminal 100.

The terminal 100 further includes an image capture device such as a digital camera 118, placed and oriented so as to have a view of a weighing volume 120, located above the top plate 115 so that an image of a container containing products placed on the top plate 115 of the scanner 106 can be captured as desired.

The transaction processing device 102 includes a processor 122, high speed memory 124, long term storage such as a hard disk 126, and a communication interface 128 for communicating with a server 130. The server 130 hosts various elements of information used in transaction processing. Notably, for the purposes of this discussion, the server 130 suitably hosts a container information table 131 storing container identification information and associating each container with the weight of the container. Once a container has been identified, the transaction processing device 102 may retrieve needed container information from the server 130. The transaction processing device 102 suitably communicates with the server 130 through a local area network 132.

When a sales transaction is to be performed, a transaction processing module 133 is suitably invoked to manage the transaction. The transaction processing module 133 is suitably implanted as software hosted on the hard disk 126 and transferred to high speed memory 124 as needed for execution by the processor 122. When a transaction entry is to be performed for products sold by weight, the transaction processing module 133 enters a weighing mode, in which operation is focused on obtaining weight information for products placed on the top plate 115 of the scanner and identifying and determining an empty weight of a container such as the bag 116. In this weighing mode, the scanner 106 is capable of operating to detect and process bar codes, but the obtaining and evaluation of bar code information is directed toward detecting and identifying a bar code identifying a container type. When the transaction processing device 102 is operating in the weighing mode, bar coded information imprinted on a container, visible characteristics exhibited by a container, or both, may be detected and processed to determine whether or not a container is present and what type of container, if any, is present. Suitably, the scanner 106 continuously processes any bar code found within a field of view of the scanner 106. When the transaction processing device 102 is in a weighing mode, the transaction processing module 133 evaluates any bar code information received from the scanner 106. Double or multiple scans are not treated as errors, but the bar code information received from multiple scans is compared to determine if it is identical, because any multiple scans should result from multiple readings of identical information on the container. If multiple non-identical bar code readings are received, a suitable error message may be presented to a user, informing the user that the object presently on the top plate 115 does not appear to be an item sold by weight.

Once the transaction processing module 133 has established that any bar code information from the scanner 106 represents a single reading, or multiple readings of an identical bar code, the transaction processing module 133 suitably consults a product information database 134 to insure that the bar code is not a bar code associated with a product sold item by item, such as a universal product code or a bar code affixed to previously weighed and packaged items. If the bar code is found in the product information database 134 and determined to be associated with a product sold item by item, the transaction processing module 133 directs display of a message notifying the user that the product does not appear to be a product sold by weight.

If a bar code has been detected and has not been established to be associated with a product sold item by item, the transaction processing module 134 consults the container information table 131 to identify a container associated with the bar code. If a container is found, the transaction processing module 133 retrieves the container weight and subtracts the container weight from a weight reading produced by the scale, to obtain a product net weight for entry into the transaction.

If no bar code is detected when products are presented to be sold by weight, or if bar code information is not used for container identification, or if it is desired to supplement bar code information with additional analysis of container features, the camera 118 captures an image of the weighing volume 120 for processing in order to examine the image and determine whether the image includes visual features indicating the presence of a container and to identify the type of container. The present exemplary embodiment includes both attempted detection and processing of bar coded container identification information and analysis of visible container features, but it will be recognized that systems and containers according to the present invention may be designed so that containers may be identified using only bar coded information or only analysis of visual features.

In order to process images captured by the camera 118, the terminal 100 also includes an image evaluation device 135. The image evaluation device 135 is shown here as a distinct element, but it will be recognized that the data processing elements of the transaction processing device 102 may be configured so as to perform functions attributed here to the image evaluation device 135.

The exemplary image evaluation device 135 illustrated here includes its own processor 136 and memory 138, and also includes long term or relatively long term storage. An example of such storage is a semipermanent high speed memory such as a flash memory 140. In addition or as an alternative to the flash memory 140, the image evaluation device 135 may include a hard disk 142.

Figure 2:
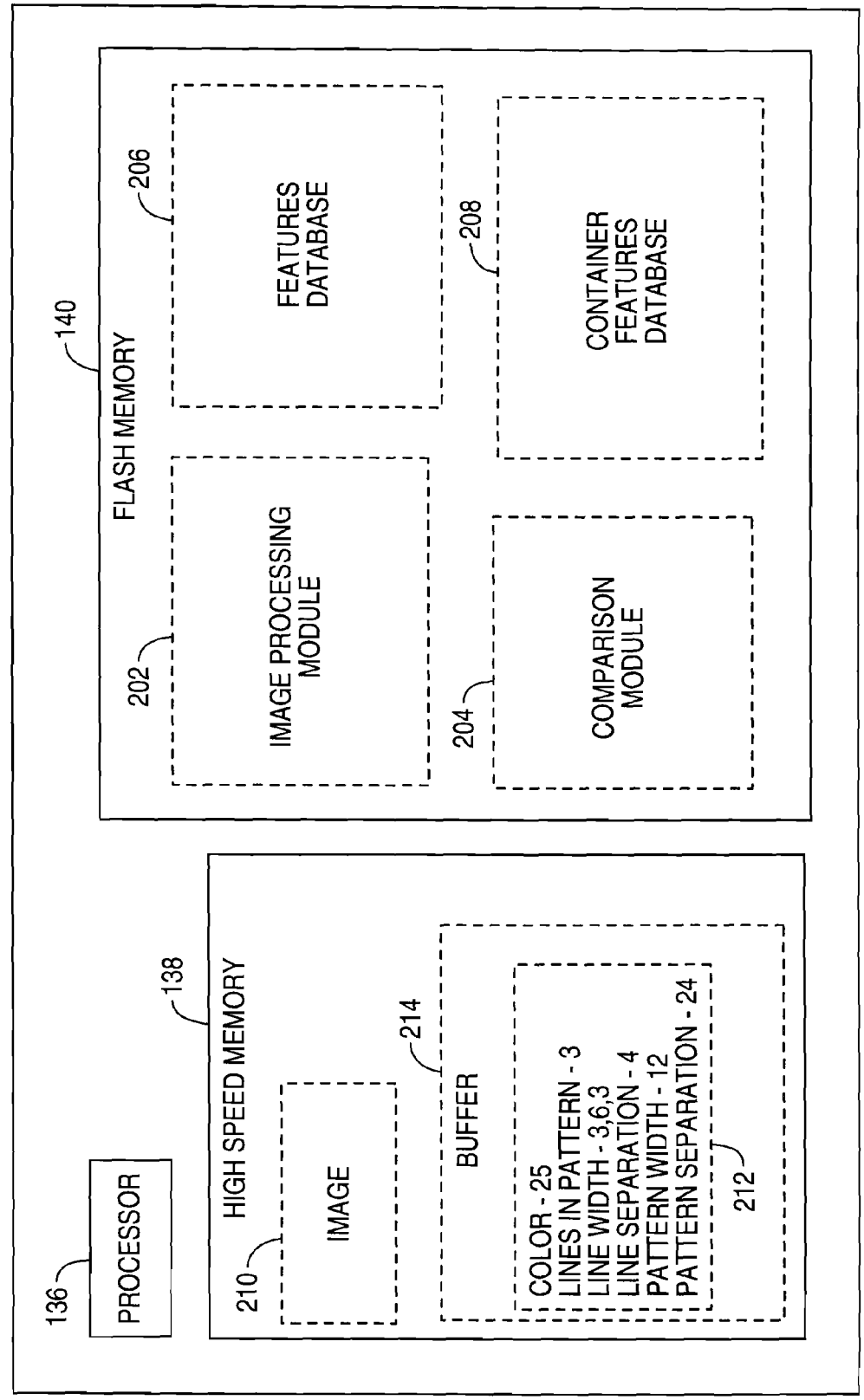
FIG. 2 illustrates additional details of an image evaluation apparatus employed by the point of sale system of FIG. 1.

FIG. 2 illustrates additional details of the image evaluation device 135, showing exemplary software modules which may be suitably hosted on and executed by the device 135. The processor 136, high speed memory 138, and flash memory 140 cooperate to execute this software as described further below. The hard disk 142 of FIG. 1 is omitted here for ease of illustration. The flash memory 140 is shown as hosting exemplary software modules 202 and 204 for transfer to the memory 138 and execution by the processor 136 as needed. The exemplary software modules include image processing module 202 and image feature comparison module 204. Flash memory is also shown as storing a features database 206 and a container features database 208.

When an object or combination of objects sold by weight is to be entered into a transaction, the object is placed in the weighing volume 120. The camera 118 captures an image 210 of the object or objects, in this case the bag 116. The image 210 is shown here as stored in the memory 138. The image 210 may also be stored in long term memory 140. However, such storage is not typically necessary for processing the image 210, because the image 210 is typically captured and stored only for the purpose of processing and extracting image information to be used to identify a container type. Once the image information has been extracted, the image 210 is no longer needed.

Once the image 210 has been captured and stored, the image processing module 202 processes the image 210 to identify distinctive features used to identify a container as belonging to a particular type. Such features may include distinctive colors, patterns of lines having specified thicknesses or separations, or other features useful for distinguishing containers. Additional or alternative features might include shapes printed on the container, such as stars or triangles. If patterns of lines are used, distinctive thicknesses and separations of lines may suitably be used in combination, so that the ratio of thickness to separation can be evaluated. In addition or as an alternative, a container may have patterns of lines of varying thickness, with the pattern preferably repeating. Using factors such as the ratio of thickness to separation helps to avoid ambiguity that may be caused if the distance of a container from the camera 118 is unknown. Using patterns of lines of varying thicknesses with known ratios between thicknesses of the lines making up the pattern also helps to avoid such ambiguity. Additional features independent of distance and other variable factors may be used. For example, containers may be characterized by colors or combinations of colors.

The image processing module 202 identifies detected features and stores image processing data 212 in an image processing buffer 214. In the present case, the buffer 214 stores values for color, the number of lines in a pattern, line width, line separation, pattern width, and pattern separation. In cases in which no distinctive container is used for products in the weighing volume 120, the image processing module 202 will typically be able to establish that no distinctive features used to identify container types are present. In establishing the presence or absence of features that may identify container types, the image processing module 202 may use the features database 206. The database 206 stores image features that may be present in the various containers. If the image processing module 202 establishes that no distinctive container is present, the image processing module 202 suitably directs sounding of an audible tone, for example, using a loudspeaker 215, indicating that analysis has been completed. If desired, the tone may be distinctive so as to indicate not only that analysis has been completed, but that the absence of a container has been established.

Once it has been established that no container is present, the pattern recognition device 135 will pass a message to the processor 122 of FIG. 1, that is, the main processor of the terminal 100, that no known container is present. In such a case, the terminal 100 will compute the weight of the item to be entered in the transaction without subtracting a container weight.

If identifiers have been generated and stored, the comparison module 204 compares the combinations of values stored in the buffer 214 against known combinations of values used to describe features of containers. These known combinations may be stored in the container features database 208 hosted in the flash memory 140, or alternatively may be stored on the hard disk 126 of the terminal 100, the container identification table 131 stored on the server 130, or another location accessible to the comparison module 204. If a match is found, the container is identified and the identification is passed to the transaction processing module 127 of FIG. 1. If no match is found, a notation that no container is present may be passed to the transaction processing module 127. Alternatively, a query may be presented to a checkout employee or customer using the display 110 of FIG. 1, requesting verification as to whether a container is being used and identification of the container type. Identification may be supplied by a user, for example by keying in an identification number associated with a container type, or selecting a container type from a text or visual menu. Each container may suitably be provided with an identification number, for example, by printing the number on the container. The presence of such a number simplifies identification for a user in cases in which automatic identification fails for one reason or another.

Suitably, determining whether or not a container is present and determining what type of container is present may be evaluated to inform the decision made by the image processing module 202 and the comparison module 204. For example, if the image processing module determines with 90% confidence or more that no container is present, transaction processing may simply continue on that basis, with no container weight being deducted. If the confidence level is lower, a query may be presented to a user asking whether or not a container is present. Similarly, if the image processing module 202 determine with a high level of confidence that a container is present, processing may continue to determine what type of container is present, while if the confidence level is lower, the user may be queried.

Similarly, if the comparison module 204 determines with 90% confidence or more that a particular type of container is present, the weight information for the container may be retrieved and deducted from the weight reading. If the confidence is 75%, the user may be presented with a description or image of the identified container and asked to confirm whether or not the identified container is the container that is actually present. If the confidence is below 50%, the user may be presented with a selection of possible containers and asked to select the container that is present.

Once a container has been identified, the comparison module 204 may direct sounding of a tone by the speaker 215. The tone may be distinctive and may differ from the tone sounded when analysis indicates that no container is present. In addition, the weight of the container is passed to or otherwise obtained by the transaction processing module 127, for example, by retrieving stored weight information from the container identification database 131. The transaction processing module 127 deducts the weight of the container from the weight provided by the scale 108, in order to obtain the net weight of the product. The transaction processing module 127 then uses the net weight information to calculate the price of the product, and enters the product in a transaction.

Figure 3:
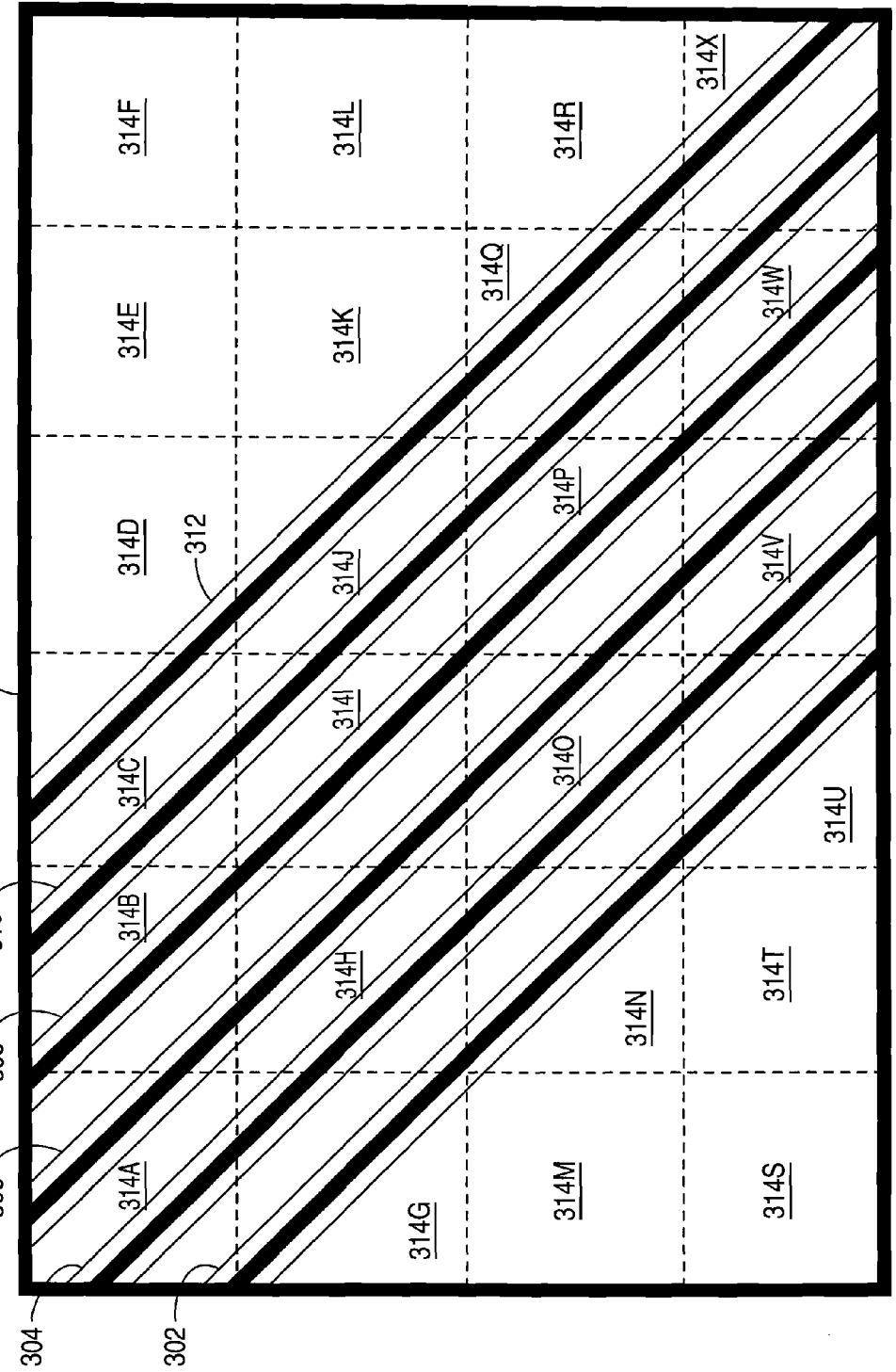
FIG. 3 illustrates details of an image captured and analyzed to perform image evaluation according to an aspect of the present invention.

FIG. 3 illustrates additional details of the image 206 representing an exemplary image capture for the bag 116. The image 210 is of a flat surface, in this example a surface of the bag 116, bearing repeating patterns 302, 304, 306, 308, 310 and 312, of diagonal lines. In addition, the image 206 includes blank areas in which the field of the camera 118 of FIG. 1 extended beyond the edges of the bag 116 or its pattern. The pattern shown in FIG. 3 is that of a thicker line between two thinner lines. Each pattern is separated from another by a gap equaling the thickness of a pattern. The thickness of this pattern is being defined as the distance from one narrow line in the pattern to the other narrow line of the pattern. Such a pattern has a high degree of distinctiveness, with features including easily definable ratios between thicknesses of features and of distances from one feature to another. The identification of features in terms of ratios provides independence from extraneous factors and helps to insure accuracy of identification.

For processing, the image 206 is suitably divided into a plurality of segments 314A-314X. Processing individual segments, with limited visual information present in each segment, helps to simplify the identification of features. For example, the segment 314N includes portions of only two patterns, the segment 314E includes only white space and the segment 314M includes only a small portion of a single pattern. The various segments can be examined in order to identify features. For example, by examining the segments 314N, 314U, 314V and other segments including only portions of two patterns, it is easy to determine the spacing between patterns. The spacing thus identified can be compared between segments to determine if it is consistent. Once the spacing has been determined to be consistent, other segments having portions of three or more patterns can be examined to determine the spacing exhibited, and this spacing can be compared with the spacing exhibited by other segments. The segments exhibiting only white spacing can be examined and their locations identified with respect to the other segments, to verify that they are on either side of the segments bearing patterns. Such identification helps to establish that the presence of white space in an image does not result from an object that does not bear a pattern, but shows instead areas of the image where the object was not present.

FIG. 4 illustrates a container 400 according to an aspect of the present invention. The container 400 includes numerous identical bar codes, of different orientations, of which the bar codes 402A, 402B, 402C and 402D are representative examples. When a container such as the container 400 is placed on a scanner such as the scanner 106, a high likelihood exists that at least one of the bar codes on the container 400 will be read, and the information provided by the bar code can be used to identify the container 400 as belonging to a particular type.

Figure 5:
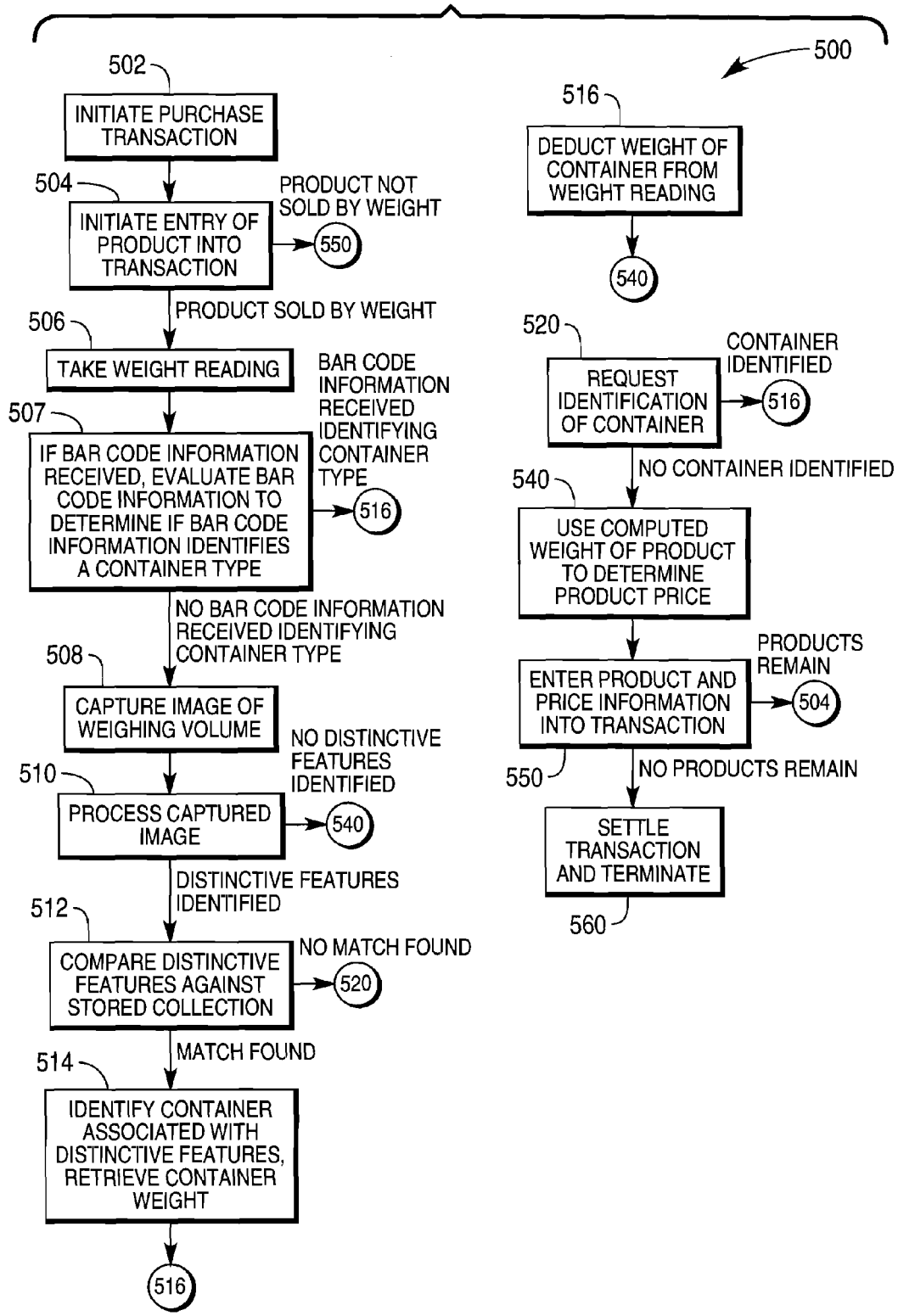
FIG. 5 illustrates a process of automatic identification of container types and identification and subtraction of container weight from a weight reading, according to an aspect of the present invention.

FIG. 5 illustrates the steps of a process 500 of transaction processing, according to an aspect of the present invention. At step 502, a purchase transaction is initiated. At step 504, an entry of a product into the transaction is initiated. If the product is not sold by weight, the process skips to step 550. If the product is sold by weight, the process continues at step 506 and a weight reading is taken upon placement of the product in a weighing volume. At step 507, if bar code information has been received from a scanner/scale combination used to weigh the product, the bar code information is evaluated to determine if it identifies a container type. If bar code information identifying a container type has been received, the process skips to step 516 and weight information for the container type is retrieved and deducted from the weight reading. If bar code information identifying a container type has not been received, the process proceeds to step 508. At step 508, an image of the weighing volume is captured. At step 510, the captured image is processed to identify distinctive features characterizing a container used to contain products for purchase. If distinctive features characterizing a container are not identified, the process skips to step 540. If distinctive features characterizing a container are identified, the process proceeds to step 512 and the features are compared against members of a collection of feature combinations in order to identify a container. If no feature combination matches the identified features, the process optionally skips to step 520, or if step 520 is not to be performed, to step 540. If a feature combination matches the identified features, the process proceeds to step 514 and a container associated with the feature combination is identified and the weight of the container retrieved. At step 516, the weight of the identified container is automatically deducted from the weight reading for the product. The process then skips to step 540.

At optional step 520, a query is presented asking a user to identify a container or to indicate that no container is present. If no container is identified, the process skips to step 540. If a container is identified, the process returns to step 416 and the weight of the identified container is retrieved and deducted from the weight reading for the product.

At step 540, the weight information resulting from the weight reading of the product, less any deductions, is used to compute the price for the product. At step 550, product identification and price information is entered into the transaction. If products remain to be entered into the transaction, the process then returns to step 404. Once no more products remain to be entered into the transaction, the process proceeds to step 460 and the process terminates with settlement of the transaction. For example, an itemized receipt is printed for the customer and the customer tenders payment.

While the present invention is disclosed in the context of a presently preferred embodiment, it will be recognized that a wide variety of implementations may be employed by persons of ordinary skill in the art consistent with the above discussion and the claims which follow below.

I claim:

1. A retail checkout terminal, comprising:
   a scale for generating weight readings for a product being sold by weight;
   one or more devices for capturing information relating to the presence, absence and identity of container type indicia, the indicia appearing on a container within which products are placed to be weighed when the container is present in a weighing volume, the indicia characterizing a container for holding products to be sold by weight as belonging to a designated type of container associated with a known weight for containers of that type; and
   one or more data processing devices for evaluating the information relating to container type indicia to determine the presence or absence of a container bearing container type indicia and to identify the container type of a container and identify the weight of a container bearing the container type indicia.

2. The terminal of claim 1, wherein the one or more devices for capturing information relating to container type indicia include a bar code scanner capable of extracting container bar code information one of a plurality of identical bar code labels placed on the container, the container bar code information being associated with container identification and weight information for the container on which the bar code labels appear.

3. The terminal of claim 2, wherein the one or more devices for processing information relating to container type indicia include a transaction processing device operative to receive the bar code information from the scanner and retrieve container and weight information associated with the bar code information.

4. The terminal of claim 1, wherein the one or more devices for capturing information relating to container type indicia include an image capture device for capturing an image of a weighing volume and the one or more devices for processing information relating to container type indicia include an image evaluation device for processing the image of the weighing volume to detect and identify a defined set of container characteristics characterizing a container for holding products to be sold by weight.

5. The terminal of claim 4, further comprising a transaction processing device for receiving and processing data relating to products being entered into a transaction, the transaction processing device being operative to receive weight readings from the scale, the transaction processing device being further operative to retrieve weight information for a container associated with a set of container characteristics upon identification of the set of container characteristics by the image evaluation device, the transaction processing device being further operative to deduct the weight of the container from the weight reading received from the scale in order to compute a net weight for the product.

6. The terminal of claim 5, wherein the image evaluation device is operative to process the image to determine whether or not distinctive features characteristic of a set of container characteristics are present in the image.

7. The terminal of claim 6, wherein upon detection by the image evaluation of distinctive features appearing to be characteristic of a set of container characteristics, the pattern recognition device compares the detected features against known sets of features to determine whether or not a defined set of container characteristics is present and to identify the defined set of container characteristics.

8. The terminal of claim 7, wherein detection and identification of a defined set of container characteristics includes detecting and evaluating elements appearing in the image, computing ratios between selected attributes of different elements, and evaluating the ratios to determine if the ratios are characteristic of ratios between attributes of selected elements of a defined set of container characteristics.

9. The terminal of claim 8, wherein the image evaluation device divides the image into segments for processing and examines adjacent segments to determine if elements appearing to be characteristic of a defined set of container characteristics extend from one segment to an adjacent segment.

10. A method of transaction processing, comprising the steps of:
    capturing information relating to the presence, absence and identity of container type indicia, the indicia appearing on a container within which products are placed to be weighed when the container is present in a weighing volume, the indicia characterizing a container for holding products to be sold by weight as belonging to a designated type of container associated with a known weight for containers of that type; and
    evaluating the information relating to the presence, absence and identity of container type indicia to determine the presence or absence of a container bearing container type indicia and to identify the container type of a container and identify the weight of a container bearing the container type indicia.

11. The method of claim 10, wherein the step of capturing information relating to the presence, absence and identity of container type indicia comprises extracting container bar code information from one of a plurality of identical bar code labels placed on the container, the container bar code information being associated with container identification and weight information for the container on which the bar code labels appear and wherein the step of evaluating the information relating to the presence, absence and identity of container type indicia comprises receiving the bar code information retrieving container and weight information associated with the bar code information.

12. The method of claim 10, wherein the step of capturing information relating to the presence, absence and identity of container type indicia includes capturing an image of a weighing volume and wherein the step of evaluating the information relating to container type indicia includes evaluating the image to detect and identify one of a plurality of sets of defined characteristics, each set of defined characteristics being associated with a type of container for holding products to be sold by weight and, upon detection and identification of a set of defined characteristics, identifying a container type associated with the identified set of defined characteristics.

13. The method of claim 12, wherein the sets of defined characteristics include characteristics of patterns appearing on the containers.

14. The method of claim 13, wherein evaluating the image includes evaluating attributes of selected elements appearing in the image and computing ratios between the attributes of selected elements.

15. The method of claim 14, further comprising receiving a weight reading for a product to be sold by weight, retrieving weight information associated with the container and deducting the weight of the container from the weight reading to obtain a net weight for the product.

* * * * *